(12) United States Patent
Wang (10) Patent No.: US 6,874,587 B2
(45) Date of Patent: Apr. 5, 2005

(54) ELECTRIC VEHICLE WITH ELECTRIC-FREE DRIVING SYSTEM

(76) Inventor: Jar Chen Wang, 16320 Bloomfield Ave., Cerritors, CA (US) 90703

( * ) Notice: Subject to any disclaimer, the term of this patent is extended or adjusted under 35 U.S.C. 154(b) by 0 days.

(21) Appl. No.: 10/144,920

(22) Filed: May 13, 2002

(65) Prior Publication Data

US 2003/0015357 A1 Jan. 23, 2003

Related U.S. Application Data

(62) Division of application No. 09/908,946, filed on Jul. 18, 2001.

(51) Int. Cl.[7] .................................................. B60K 1/00
(52) U.S. Cl. ...................... 180/65.1; 180/205; 280/218; 280/242.1
(58) Field of Search .............................. 280/1.181, 218, 280/242.1, 244, 246, 249; 180/65.1, 65.6, 215, 216, 180, 181, 205

(56) References Cited

U.S. PATENT DOCUMENTS

| | | | | | |
|---|---|---|---|---|---|
| 1,327,129 A | * | 1/1920 | Wolff | .......................... | 180/65.1 |
| 1,977,317 A | * | 10/1934 | Maypole | ................... | 280/1.181 |
| 3,804,427 A | * | 4/1974 | Lohr et al. | ................... | 280/244 |
| 3,807,760 A | * | 4/1974 | Jordan | ........................ | 280/218 |
| 3,863,950 A | * | 2/1975 | Jordan | ........................ | 280/218 |
| 3,902,739 A | * | 9/1975 | Kimura | ...................... | 280/249 |
| 4,399,883 A | * | 8/1983 | Todokoro | ................... | 180/65.1 |
| 4,484,649 A | * | 11/1984 | Kennedy et al. | ............ | 180/216 |
| 4,560,022 A | * | 12/1985 | Kassai | ........................ | 180/65.1 |
| 5,699,869 A | * | 12/1997 | Fritzinger et al. | ......... | 180/65.5 |
| 6,502,843 B1 | * | 1/2003 | Gu | .............................. | 280/218 |

* cited by examiner

Primary Examiner—Christopher P. Ellis
Assistant Examiner—Brian Swenson
(74) Attorney, Agent, or Firm—Raymond Y. Chan; David and Raymond (57) ABSTRACT

An electric vehicle includes a vehicle frame, at least a driven wheel rotatably supported by the vehicle frame, and a power generator device including a clutch device for selectively engaging with the driven wheel assembly to drive the driven wheel rotate. The electric vehicle further includes an electric-free driving system including a transmission unit having a control portion positioned above the vehicle frame and a connecting portion extended underneath the vehicle frame, a steering device affixed to the control portion of the transmission unit for driving the connecting portion thereof to rotate in clockwise and anti-clockwise directions, a twister member having a driven portion connected to the connection portion of the transmission unit, and a pair of driving wheels spacedly and rotatably mounted to the twister member wherein the two driving wheels are spaced apart from the driven portion of the twister member.

13 Claims, 6 Drawing Sheets

ELECTRIC VEHICLE WITH ELECTRIC-FREE DRIVING SYSTEM

CROSS REFERENCE OF RELATED APPLICATION

The present application is a divisional application of a non-provisional application with application Ser. No. 09/908,946 filed on Jul. 18, 2001.

BACKGROUND OF THE PRESENT INVENTION

1. Field of Invention

The present invention relates to an electric vehicle, and more particularly to an electric vehicle with electric-free driving system, which can be selectively impelled by electrical power or by manually.

2. Description of Related Arts

A conventional electric vehicle comprises a supporting frame, a wheel assembly comprising at least two wheels spacedly and rotatably mounted underneath the supporting frame, and an electric motor operatively connected to the wheel assembly such that the electric vehicle can be propelled by means of mechanical power. However, such conventional electric vehicle has several drawbacks.

Since the electric vehicle is powered by the motor, the wheel will be locked up in a rotatably movable manner when the motor is out of battery. So, a rider may merely have a chance to carry the electric vehicle. Due to the heavy weight of the electric vehicle, it is an extremely difficult for the rider, even an adult, to carry the electric vehicle for a long distance.

An improved electric vehicle is developed that the wheels are capable of free rotating when the electric motor is used up its power. In other words, the electric vehicle must be employed with a clutch device for releasing the lock-up position of the wheels such that the wheels can be freely rotated when the wheels are disengaged with the motor. Therefore, when the motor is out of battery, the rider can push the electric vehicle instead of carrying the electric vehicle everywhere. However, it is unreasonable for a young child to push the electric vehicle for a long distance. Besides, the complicated mechanical structure of the electric vehicle will further increase the manufacturing cost thereof. So, an alternative is sought for.

SUMMARY OF THE PRESENT INVENTION

A main object of the present invention is to provide an electric vehicle with electric-free driving system, which is adapted for selectively propelling by a power generator or by manually. The rider may switch the electric vehicle to powered operate or to manual operate anytime and anywhere easily. In other words, even though the power generator is run out of power, the electric vehicle can be operated by manually through the electric-free driving system.

Another object of the present invention is to provide an electric vehicle with electric-free driving system, which does not require to alter the original simple structure so as to reduce the manufacturing cost of the electric vehicle incorporating with the electric-free driving system.

Another object of the present invention is to provide an electric vehicle with electric-free driving system, wherein the electric-free driving system is simple and easy to operate, so that every individual, even a young child, is able to operate the electric vehicle manually.

Accordingly, in order to accomplish the above objects, the present invention provides an electric vehicle, which comprises:

a vehicle frame;

a driven wheel assembly comprising at least a driven wheel rotatably supported by the vehicle frame; and a power generator device supported by the vehicle frame comprising a clutch means for selectively engaging with the driven wheel assembly to drive the driven wheel rotate and disengaging with the driven wheel assembly such that the driven wheel is in a free rotating manner; and an electric-free driving system, comprising:

a transmission unit having an upper control portion positioned above the vehicle frame and a lower connecting portion extended underneath the vehicle frame;

a steering means affixed to the control portion of the transmission unit for driving the connecting portion thereof to rotate in clockwise and anti-clockwise directions;

a twister member having a driven portion connected to the connecting portion of the transmission unit; and a pair of driving wheels spacedly and rotatably mounted to the twister member wherein the two driving wheels are spaced apart from the driven portion of the twister member.

DETAILED DESCRIPTION OF THE PREFERRED EMBODIMENT

Figure 1:
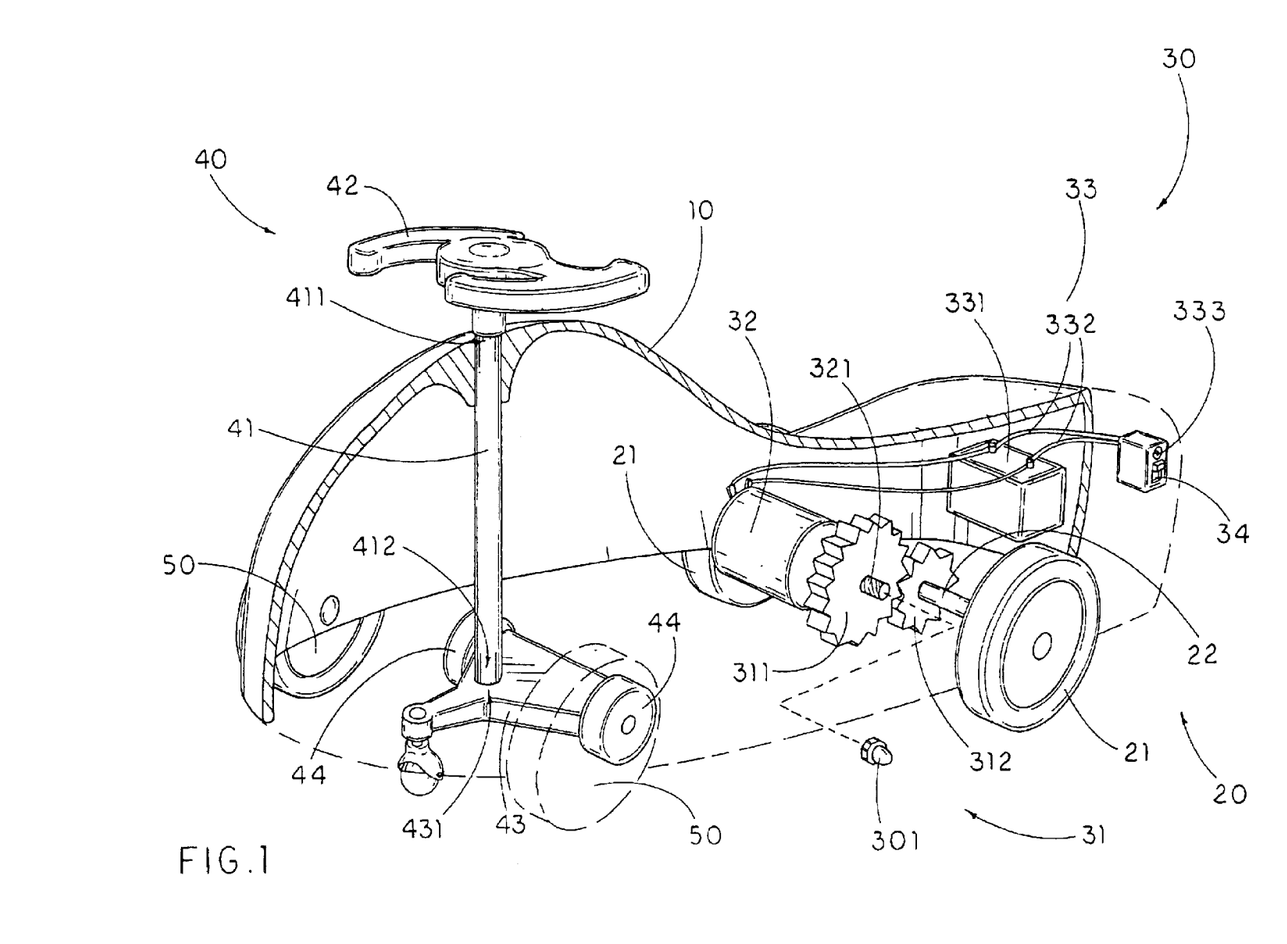
FIG. 1 is a perspective view of an electric vehicle with electric-free driving system according to a first preferred embodiment of the present invention.
Figure 2:
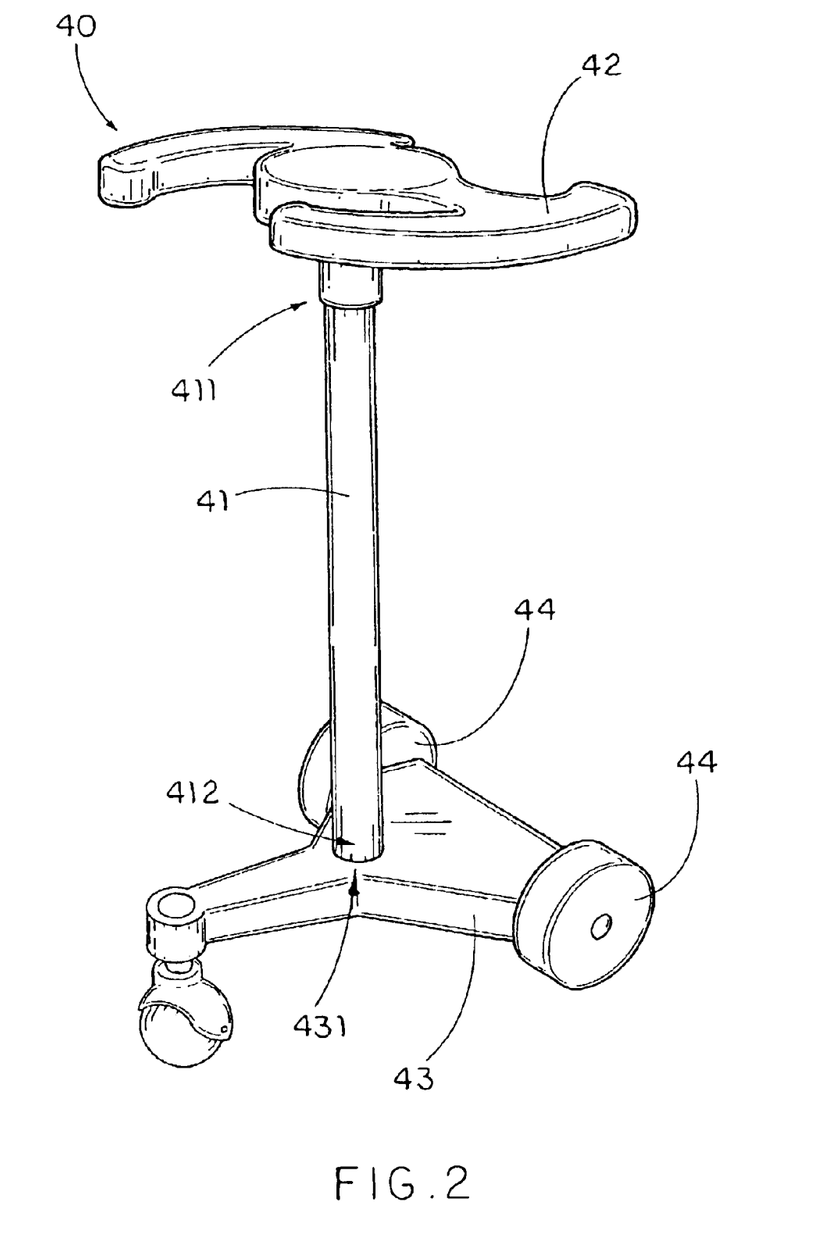
FIG. 2 is a perspective view of the electric-free driving system of the electric vehicle according to the above first preferred embodiment of the present invention.

Referring to FIGS. 1 and 2 of the drawings, an electric vehicle according to a preferred embodiment of the present invention is illustrated, wherein the electric vehicle., such as a standard electric vehicle, comprises a vehicle frame 10, a driven wheel assembly 20 comprising at least a driven wheel 21 rotatably supported by the vehicle frame 10, and a power generator device 30 supported by the vehicle frame 10 comprising a clutch means 31 for selectively engaging with the driven wheel assembly 20 to drive the driven wheel 21 rotate and disengaging with the driven wheel assembly 20 such that the driven wheel 21 is in a free rotating manner.

The electric vehicle further comprises an electric-free driving system 40 comprising a transmission unit 41 having an upper control portion 411 positioned above the vehicle frame 10 and a lower connecting portion 412 extended underneath the vehicle frame 10, a steering means 42 affixed to the control portion 411 of the transmission unit 41 for driving the connecting portion 411 thereof to rotate in clockwise and anti-clockwise directions, a twister member 43 having a driven portion 431 connected to the connecting portion 411 of the transmission unit 40, and a pair of driving wheels 44 spacedly and rotatably mounted to the twister member 43 wherein the two driving wheels 44 are spaced apart from the driven portion 431 of the twister member 43.

According to the preferred embodiment, the driven wheel assembly 20, supported at a rear portion of the vehicle frame 10, comprises two driven wheels 21 which are rear wheels of the electric vehicle rotatably and spacedly mounted at the rear portion of the vehicle frame 10 via a wheel axle 22. In other words, the wheel axle 22 has two end portions for rotatably supporting the two driven wheels 21 on the vehicle frame 10 respectively.

The power generator device 30 further comprises an electric motor 32 supported by the vehicle frame 10 for driving an output axle 321 to rotate and a power source 33 connecting to the electric motor 32, wherein the clutch means 31 is operatively connected to the output axle 321 of the electric motor 32 to selectively engage and disengage with the wheel axle 22 to drive the driven wheels 21 to rotate. The power generator device 30 further comprises a control switch 34 for selectively switching the electric motor 32 on and off, so as to select the electric vehicle propelling by the electric motor 32 in a powered manner or by the electric-free driving system 40 in a manual manner.

The clutch means 31 comprises a first gear member 311 coaxially and detachably connected to the output axle 321 of the electric motor 31 and a second gear member 312 coaxially connected to the wheel axle 22, wherein the clutch means 31 is arranged to operate and maintain the first gear member 311 between a powered driving position and an idle position. In the powered driving position, the first gear member 311 is engaged with the second gear member 312 to drive the driven wheels 21 to rotate through the wheel axle 22. In the idle position, the first gear member 311 is disengaged with the second gear member 312 such that the driven wheels 21 are in a free rotating manner.

In order to selectively switch the electric vehicle in a powered manner and in a manual manner, the first gear member 311 is detachably attached to the output axle 321 of the electric motor 31 via a connecting nut 301 in such a manner that by attaching the first gear member 311 to the output axle 321 so as to engage with the second gear member 312, the electric vehicle is powered by the electric motor 32 and by detaching the first gear member 311 to the output axle 321 so as to disengage with the second gear member 312, the electric vehicle is driven by the electric-free driving system manually.

The power source 33 comprises at least a rechargeable battery 331 disposed in the vehicle frame 10 and at least an electrical wire 332 extended from the rechargeable battery 331 to the electric motor 32. A transmitting power input 333 is adapted to electrically extended from the rechargeable battery 331 such that the rechargeable 331 is adapted for selectively recharging by an AC current charger or a DC current car charger through the transmitting power input 333.

As shown in FIG. 2, the steering means 42 comprises at least a hand bar which functions as a steering wheel for a rider to drive the twister member 43 to rotate wherein the steering means 42 is capable of not only moving the electric vehicle forwardly or backwardly in a manual manner but also directing the course of the electric vehicle in a powered manner.

The transmission unit 41 is a shaft having a top end which is the control portion 411 of the transmission unit 11 connected to the steering means 42 and a bottom end which is the connecting portion 412 of the transmission unit 41 connected to the twister member 43 wherein the transmission unit 41 is rotatably penetrated through the vehicle frame 10 in such a manner that the steering means 42 is arranged to drive the twister member 43 to rotate when a rotating force is applied on the steering means 42.

The twister member 43 having a triangularly shaped, preferred isosceles triangularly shaped, has a front end portion which is the driven portion 431 and two rear side portions 432 rotatably affixed to the two driving wheels 44 respectively. In other words, the two driving wheels 44 have the same distance from the driven portion 431 of the twister member 43. Therefore, due to the rotational movement of the two driving wheels 44 with respect to the driven portion 431 of the twister member 43, the electric vehicle is adapted for manually moving forwardly and backwardly. It is worth to mention that for manually moving the electric vehicle forward, the driven portion 431 of the twister member 43 is positioned in front of the two driving wheels 44, and for manually moving the electric vehicle backward, the driven portion 431 of the twist member 43 is positioned behind the two driving wheels 44.

Alternatively, the twist member 43 can be constructed to have a T-shape structure and has a front end which is the driven portion 431 to connect the connecting portion 412 of the transmission unit 41 and two rear side ends 432 rotatably affixed the two driving wheels 44 thereto respectively.

Referring to FIG. 1, the electric vehicle further comprises a pair of auxiliary wheels 50 spacedly attached to a front portion of the vehicle frame 10 in a free rotating manner wherein the two auxiliary wheels 50 are adapted for supporting the vehicle frame 10 in a stabilized manner.

Figure 3A:
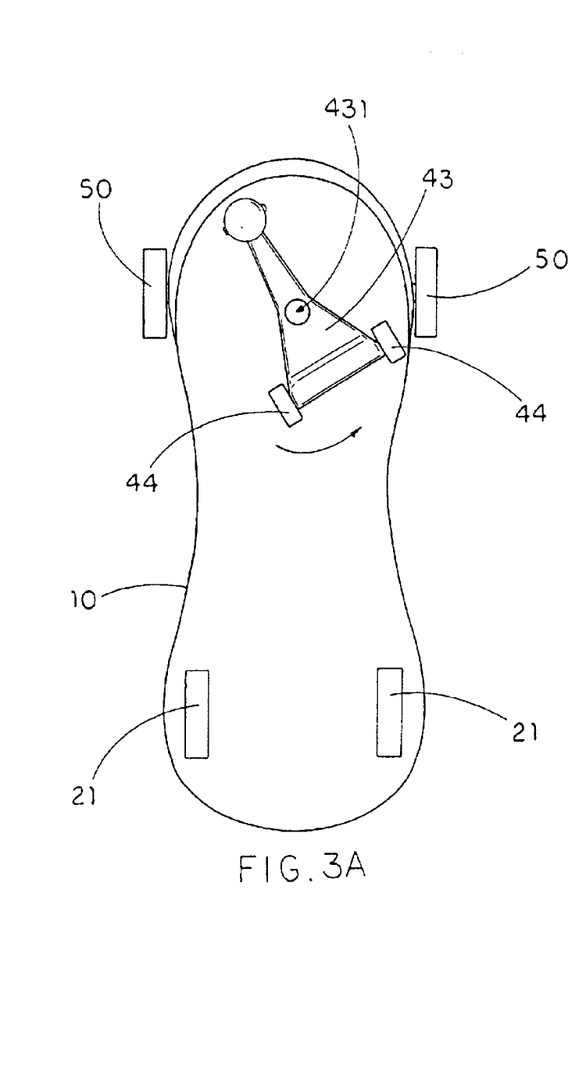
FIGS. 3A and 3B are bottom views of the electric vehicle with electric-free driving system according to the above first preferred embodiment of the present invention, illustrating the rotating movement of the electric-free driving system.
Figure 3B:
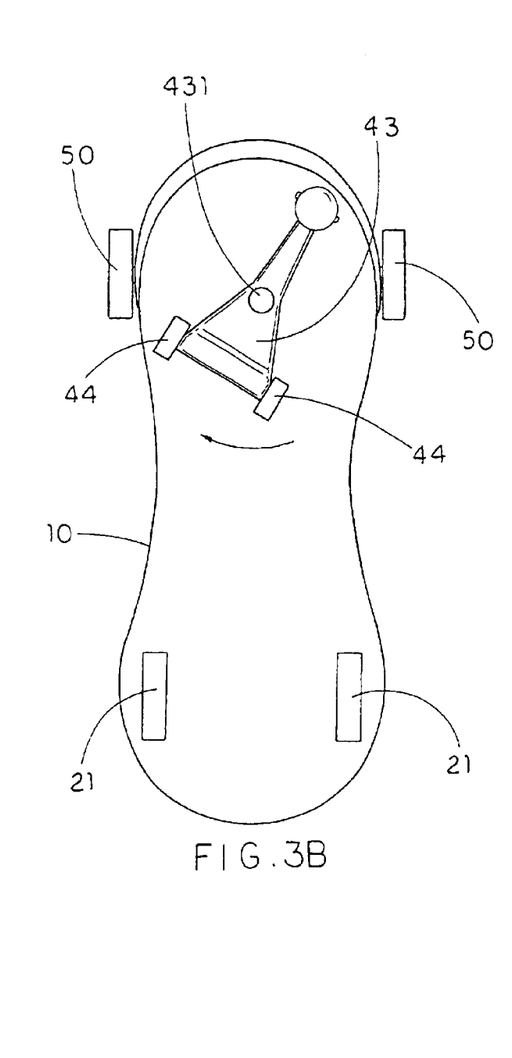

In order to drive the electric vehicle, a rider must intentionally switch the electric vehicle in the idle position, that is to disengage the first gear member 311 with the second gear member 312, such that the rider is able to drive the electric vehicle manually by the electric-free driving system 40. In order to manually drive the electric vehicle, a rotating force must applied on the steering means 42 to drive the twister member 43 to rotate in a clockwise and anti-clockwise manner. Therefore, due to the twist movement of the two driving wheels 21 with respect to the driven portion 431 of the twister member 43, the electric vehicle is adapted for moving forwardly or backwardly, as shown in FIGS. 3A and 3B.

Figure 4:
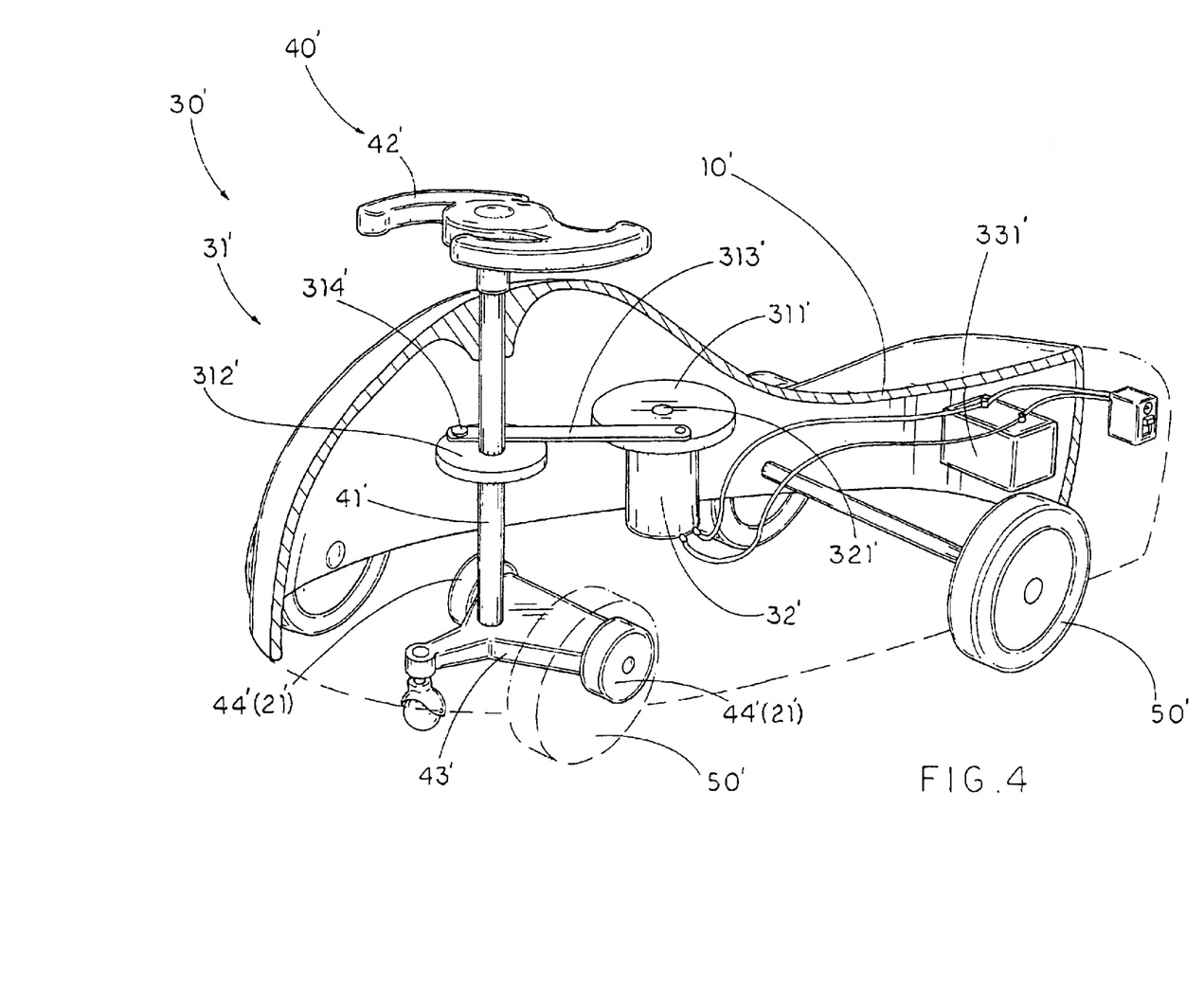
FIG. 4 is a perspective view of an electric vehicle with electric-free driving system according to a second preferred embodiment of the present invention.

Referring to FIG. 4, a second embodiment of the electric vehicle illustrates an alternative mode of the above first embodiment of the present invention, wherein the electric-free driving system 40' is selectively operated by the power generator device 30' and by manually.

According to the second embodiment, the driven wheel assembly 20' is the electric-free driving system 40' which is capable of selectively powering by the power generator device 30' and operating by manually. Accordingly, the driven wheels 21 of the driven wheel assembly 20' are the driving wheels 44' of the electric-free driving system 40'.

The clutch means 31' comprises a driving disc 311' coaxially connected to the output axle 321' of the electric motor 31', a driven disc 312' coaxially connected to the transmission unit 41', and a driving arm 313' having two ends rotatably and radially connected to the driving disc 311' and the driven disc 312' respectively and arranged to drive the driven disc 312' to rotate in a sequential clockwise and anti-clockwise manner by the driving disc 311' through the driving arm 313'. A length of the driving arm 313' must be longer than a sum of a radius of the driving disc 311' and a radius of the driven disc 312'. In other words, the driving disc 311' is driven to rotate by the output axle 321', so as to drive the driving disc 312' to rotate through the driving arm 313'.

Figure 5A:
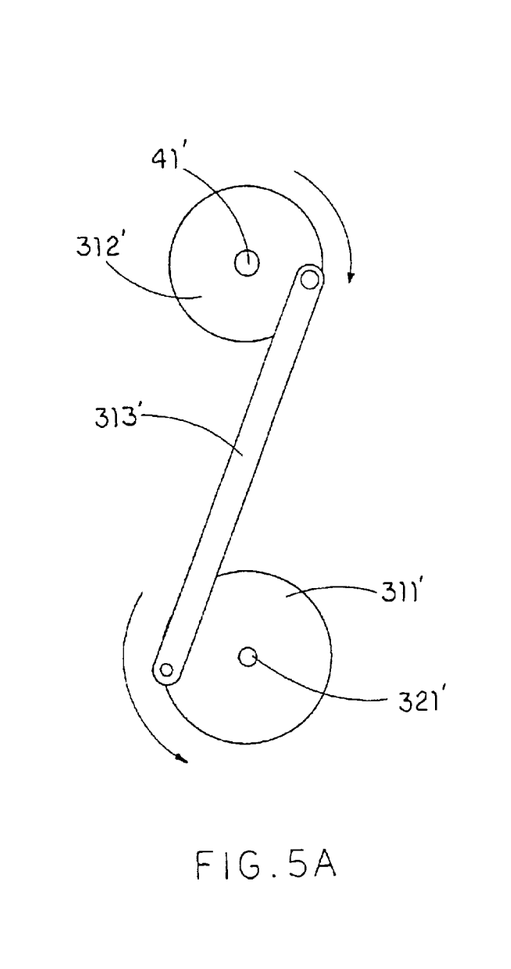
FIGS. 5A and 5B are bottom views of the electric-free driving system of the electric vehicle according to the above second preferred embodiment of the present invention, illustrating the rotating movement of the electric-free driving system.
Figure 5B:
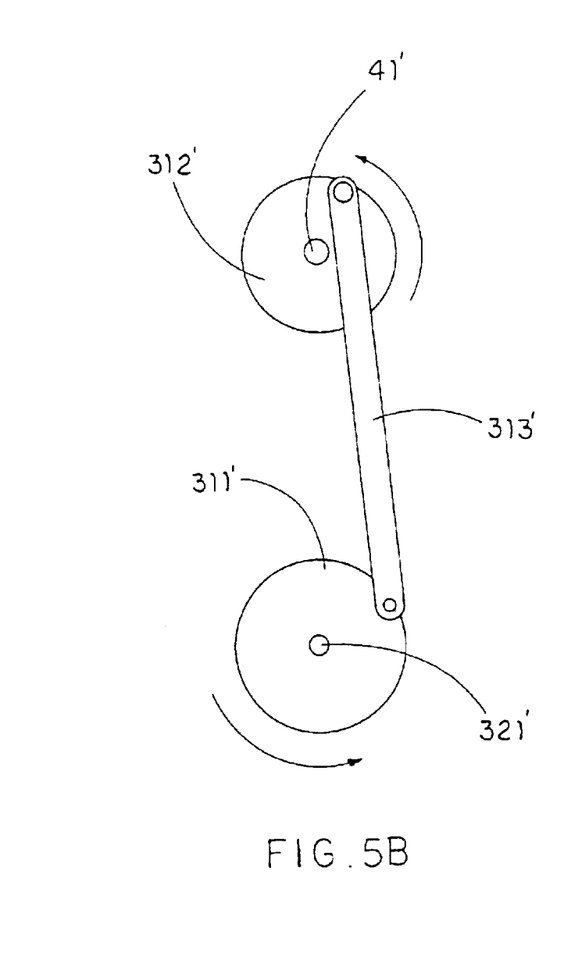

As shown in FIGS. 5A and 5B, the end of the driving arm 313' mounted on the driving disc 311' is forced to move in a circular manner with respect to the driving disc 311' and the other end of the driving arm 313' mounted on the driven disc 312' is driven in an arc-curve manner so as to drive the driven disc 312' in the sequential clockwise and anti-clockwise rotational movement. Therefore, the transmission unit 41' is arranged to rotate in a sequential clockwise and anti-clockwise manner for turning the twister member 43' to rotate, so as to drive the electric vehicle which is powered by the electric motor 31'.

It is worth to mention that a distance between the driving disc 311' and the driven disc 312' determines a rotational movement of the driven disc 312'. The longer distance between the driving disc 311' and the driven disc 312' is, the larger rotational movement of the driven disc 312' is. In other words, in order to provide a larger sequential clockwise and anti-clockwise rotational force for the driven disc 312', a longer driving arm 313' can be used, so as to drive the electric vehicle faster.

Figure 6:
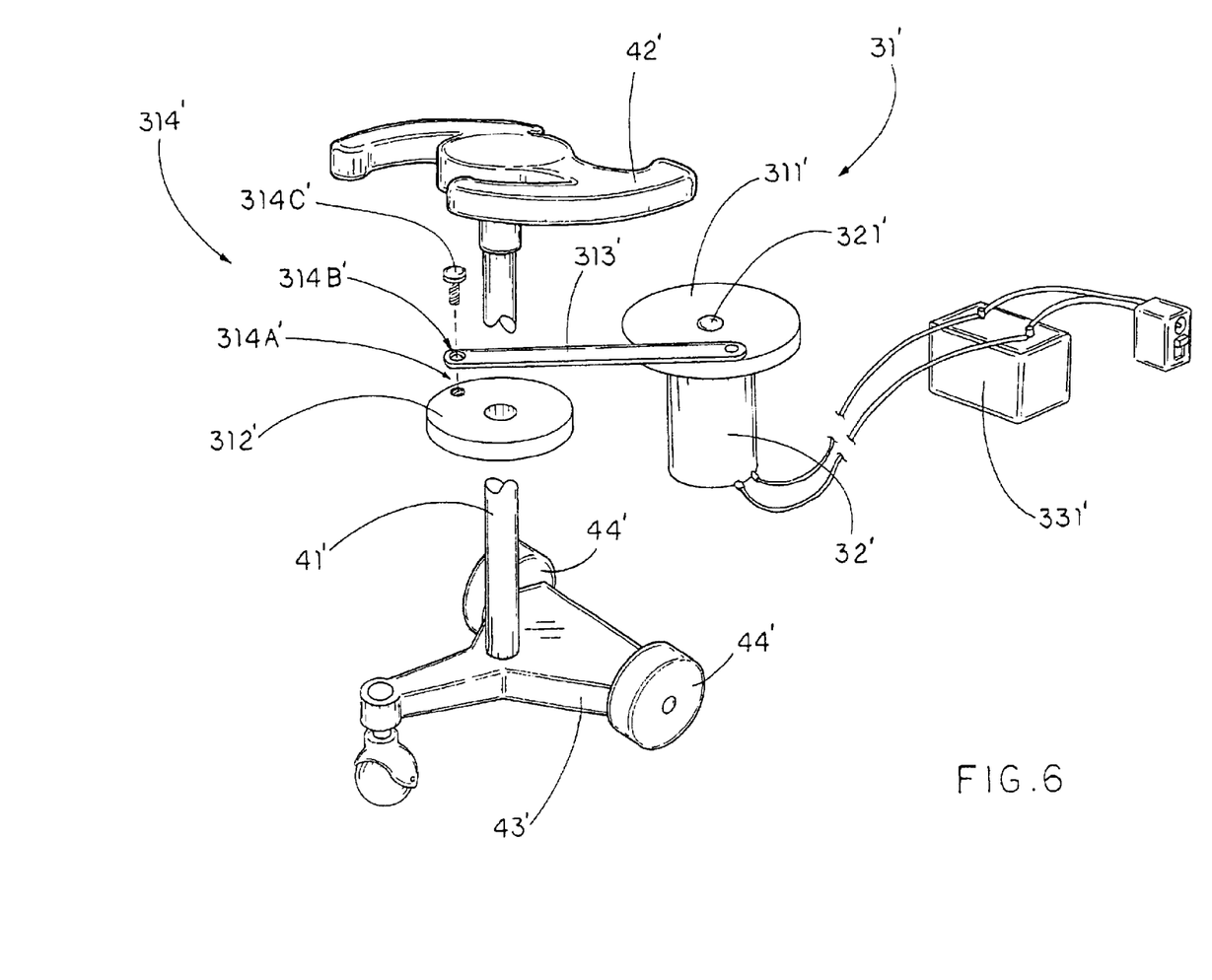
FIG. 6 is an exploded perspective view of a locker means of the electric vehicle according to the above second preferred embodiment of the present invention.

In order to select the electric vehicle manually, the clutch means 31' further comprises a locker means 314' for detachably locking the driving arm 313' to the driven disc 312' wherein the locker means 314' has a locker slot 314a' radially provided on the driven disc 312', a through slot 314b' provided on the respective end of the driving arm 313', and a locker body 314c' arranged to detachably insert into the locker slot 314a' through the through slot 314b', so as to securely mount the driving arm 313' on the driven disc 312', as shown in FIG. 6. Therefore, the rider is able to insert the locker body 314c' into the locker slot 314a' for engaging the driving arm 313' with the driven disc 312' such that the electric vehicle is powered by the electric motor 31'. By detaching the locker body 314c' from the driven disc 312', the electric-free driving system 40' does not powered by the power generator device 30', such that the rider is able to drive the electric vehicle manually.

As shown in FIG. 4, the electric vehicle further comprises two pair of auxiliary wheels 50' spacedly attached to a front portion and a rear portion of the vehicle frame 10' 15 in a free rotating manner wherein the four auxiliary wheels 50' are adapted for supporting the vehicle frame 10' in a stabilized manner.

What is claimed is:

1. An electric vehicle, comprising:
   a vehicle frame;
   a driven wheel assembly comprising two driven wheels spacedly and rotatably mounted on a rear portion of said vehicle frame; and
   a power generator device comprising an electric motor supported by said vehicle frame and a clutch means for selectively engaging with said driven wheel assembly to drive said driven wheel rotate and disengaging with said driven wheel assembly, wherein said clutch means comprises a first gear member driven to be rotated by said electric motor and a second gear member coaxially coupled between said two driven wheels to selectively engage with said first gear member; and
   an electric-free driving system, comprising:
   a transmission unit having an upper control portion positioned above said vehicle frame and a lower connecting portion extended underneath said vehicle frame;
   a steering means affixed to said control portion of said transmission unit for driving said connecting portion thereof to rotate in clockwise and anti-clockwise directions;
   a twister member having a driven portion connected to said connecting portion of said transmission unit; and
   two driving wheels spacedly and rotatably mounted to said twister member wherein said two driving wheels are spaced apart from said driven portion of said twister member, wherein when said first gear member is engaged with said second gear member, said driven wheels are driven to rotate by said electric motor to propel said electric vehicle, and when said first gear member is disengaged by said second gear member, said driven wheels are in free rotating manner such that said electric vehicle is propelled by said electric-free driving system.

2. An electric vehicle, as recited in claim 1 wherein said driven wheel assembly is said electric-free driving system which is capable of selectively powering by said power generator device and operating by manually, such that said driven wheels of said driven wheel assembly are said two driving wheels of said electric-free driving system.

3. An electric vehicle, as recited in claim 1, wherein said power generator device further comprises an output axle rotatably extended from said electric motor to coaxially couple with said first gear member such that when said electric motor operates, said first gear member is driven to rotate through said output axle to drive said second gear member to rotate so as to drive said driven wheels to rotate.

4. An electric vehicle, as recited in claim 3, wherein said first gear member is detachably mounted to said output axle to selectively engage with said second gear member, wherein when said first gear member is detached from said output axle, said first gear member is disengaged with said second member such that said second gear member is in a free rotating manner to allow said driven wheels to freely rotate at said vehicle frame.

5. An electric vehicle, as recited in claim 1, wherein said driven wheel assembly further comprises a wheel axle coaxially coupled between said two driven wheels, wherein said second gear member is coaxially mounted at said wheel axle to selectively engage with said first gear member to drive said driven wheels to rotate through said wheel axle.

6. An electric vehicle, as recited in claim 3, wherein said driven wheel assembly further comprises a wheel axle coaxially coupled between said two driven wheels, wherein said second gear member is coaxially mounted at said wheel axle to selectively engage with said first gear member to drive said driven wheels to rotate through said wheel axle.

7. An electric vehicle, as recited in claim 4, wherein said driven wheel assembly further comprises a wheel axle coaxially coupled between said two driven wheels, wherein said second gear member is coaxially mounted at said wheel axle to selectively engage with said first gear member to drive said driven wheels to rotate through said wheel axle.

8. An electric vehicle, as recited in claim 1, wherein said transmission unit comprises a shaft, which is rotatably penetrated through said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

9. An electric vehicle, as recited in claim 3, wherein said transmission unit comprises a shaft, which is rotatably penetrated though said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

10. An electric vehicle, as recited in claim 4, wherein said transmission unit comprises a shaft, which is rotatably penetrated through said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

11. An electric vehicle, as recited in claim 5, wherein said transmission unit comprises a shaft, which is rotatably penetrated through said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

12. An electric vehicle, as recited in claim 6, wherein said transmission unit comprises a shaft, which is rotatably penetrated th ugh said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

13. An electric vehicle, as recited in claim 7, wherein said transmission unit comprises a shaft, which is rotatably penetrated through said vehicle frame, having a top end forming said control portion connecting to said steering means and a bottom end forming connecting portion connecting to said twister member such that when said first gear member is disengaged with said second gear member, said twister member is driven by said steering means through said shaft to manually propel said electric vehicle.

\* \* \* \* \*